United States Patent
Cho et al.

(10) Patent No.: US 10,996,425 B2
(45) Date of Patent: May 4, 2021

(54) UNIT FOR ACTUATING LENS, CAMERA MODULE, AND OPTICAL APPARATUS

(71) Applicant: LG INNOTEK CO., LTD., Seoul (KR)

(72) Inventors: Jae Hong Cho, Seoul (KR); Sang Hee Lee, Seoul (KR); In Jae Yeo, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 226 days.

(21) Appl. No.: 15/960,055

(22) Filed: Apr. 23, 2018

(65) Prior Publication Data

US 2018/0239107 A1 Aug. 23, 2018

Related U.S. Application Data

(63) Continuation of application No. 14/792,658, filed on Jul. 7, 2015, now Pat. No. 9,977,219.

(30) Foreign Application Priority Data

Jul. 11, 2014 (KR) .................. 10-2014-0087206
Jul. 11, 2014 (KR) .................. 10-2014-0087208
Aug. 11, 2014 (KR) .................. 10-2014-0103557

(51) Int. Cl.
*G02B 7/09* (2021.01)
*G02B 27/64* (2006.01)
(Continued)

(52) U.S. Cl.
CPC ............. *G02B 7/09* (2013.01); *G02B 13/001* (2013.01); *G02B 27/646* (2013.01); *G03B 3/10* (2013.01)

(58) Field of Classification Search
CPC ....... G02B 13/001; G02B 27/646; G02B 7/09; G03B 3/10
See application file for complete search history.

(56) References Cited

U.S. PATENT DOCUMENTS 9,046,642 B2   6/2015 Sugawara et al.
2010/0039719 A1   2/2010 Park et al.
(Continued)

FOREIGN PATENT DOCUMENTS

CN    101578755 A    11/2009
CN    102401968 A     4/2012
(Continued)

OTHER PUBLICATIONS

Office Action dated Jun. 20, 2019 in Chinese Application No. 201510409449.8.
(Continued)

*Primary Examiner* — Joseph P Martinez
*Assistant Examiner* — Vipin Patel
(74) *Attorney, Agent, or Firm* — Saliwanchik, Lloyd & Eisenschenk (57) ABSTRACT

A lens actuating unit is provided. The lens actuating unit includes: a bobbin configured to accommodate a lens module at an inner side of the bobbin; a first coil unit disposed at the bobbin; a housing disposed at an outer side of the bobbin; and a magnet unit configured to move the first coil unit through electromagnetic interaction with the first coil unit, wherein the housing includes a hole formed by being recessed from an inner side to an outer side to accommodate the magnet unit.

20 Claims, 3 Drawing Sheets

(51) Int. Cl.
*G03B 3/10* (2021.01)
*G02B 13/00* (2006.01)

(56) References Cited

U.S. PATENT DOCUMENTS

| | | | |
|---|---|---|---|
| 2010/0149667 A1 | 6/2010 | Wade et al. | |
| 2011/0286732 A1 | 11/2011 | Hosokawa et al. | |
| 2012/0057252 A1 | 3/2012 | Ishiguro et al. | |
| 2012/0300111 A1* | 11/2012 | Ke | H04N 5/2257 348/335 |
| 2013/0016428 A1 | 1/2013 | Sugawara et al. | |
| 2013/0050828 A1* | 2/2013 | Sato | G02B 27/64 359/557 |
| 2013/0222914 A1 | 8/2013 | Han | |
| 2014/0177056 A1 | 6/2014 | Hayashi et al. | |
| 2016/0377881 A1* | 12/2016 | Jung | H02K 41/0356 359/824 |

FOREIGN PATENT DOCUMENTS

| | | | |
|---|---|---|---|
| CN | 102811307 A | 12/2012 | |
| CN | 102879972 A | 1/2013 | |
| CN | 103296855 A | 9/2013 | |
| JP | 2000-251292 A | 9/2000 | |
| JP | 2006-227103 A | 8/2006 | |
| JP | 2011-39426 A | 2/2011 | |
| JP | 2013-024944 A | 2/2013 | |
| JP | 2014-126668 A | 7/2014 | |
| KR | 20-2010-0008757 U | 9/2010 | |
| KR | 1020140000122 * | 1/2014 | G02B 27/646 |
| WO | WO-2014/003492 A1 | 1/2014 | |
| WO | WO-2014/014222 A1 | 1/2014 | |

OTHER PUBLICATIONS

Office Action dated Jan. 30, 2020 in Korean Application No. 10-2014-0087206.

Office Action dated Jan. 30, 2020 in Korean Application No. 10-2014-0087208.

Office Action dated Aug. 20, 2020 in Korean Application No. 10-2014-0103557.

* cited by examiner

UNIT FOR ACTUATING LENS, CAMERA MODULE, AND OPTICAL APPARATUS

CROSS-REFERENCE TO RELATED APPLICATIONS

This application is a continuation of U.S. application Ser. No. 14/792,658, filed Jul. 7, 2015; which claims the benefit under 35 U.S.C. § 119 of Korean Application Nos. 10-2014-0087206, filed on Jul. 11, 2014; 10-2014-0087208, filed on Jul. 11, 2014; and 10-2014-0103557, filed on Aug. 11, 2014, which are hereby incorporated by reference in their entirety.

BACKGROUND

Field of the Invention

The present disclosure relates to a lens actuating unit, a camera module and an optical apparatus.

Background of the Related Art

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data.

In recent years, there has been a growing demand for small-sized lens actuating motors in a wide variety of multimedia field such as notebook personal computers, camera-equipped mobile phones, PDAs, or smart toys, and even for surveillance cameras or image input devices such as information terminals of video tape recorders.

The camera module includes a lens actuating unit. Such lens actuating unit moves a lens module by interaction between a plurality of magnets and a coil arranged as to face the magnets. However, the conventional lens actuating unit has a problem in that the magnets may be dropped out from the housing.

In addition, the lens actuating unit may include an actuator for auto focusing, and may further include an actuator for handshake compensation. In such case, the lens actuating unit may include a circuit board for supplying electric power to the actuator. However, the conventional lens actuating unit has a problem in that the short circuit between a terminal portion of the circuit board and an external electrical power may occur.

BRIEF SUMMARY

One purpose of the present disclosure is to suggest a structure where assembly tolerance of the magnets is minimized and the magnet can be strongly fixed to the housing, thereby to provide a lens actuating unit having enhanced reliability.

In addition, the present disclosure suggests a structure to strongly fix the terminal portion, thereby to provide a lens actuating unit having enhanced reliability.

In a general aspect of the present disclosure, there is provided a lens actuating unit, the lens actuating unit comprising: a first coil unit; a magnet unit facing an outer lateral surface of the first coil unit; a housing configured to accommodate the magnet unit and including a hole formed on the housing; a base configured to support the base; and a cover member configured to accommodate a mover and an actuator.

In some exemplary embodiments of the present disclosure, the hole may be formed in a shape corresponding to that of a magnet of the magnet unit.

In some exemplary embodiments of the present disclosure, at least one adhesive introduction hole may be formed on at least one lateral surface of the hole.

In some exemplary embodiments of the present disclosure, the mover may include a second coil unit arranged on the base so as to face the magnet unit, and a circuit board arranged between the second coil unit and the base and further including a terminal portion formed by being bent on a lateral surface of the circuit board so as to be connected to an external electrical power.

In some exemplary embodiments of the present disclosure, an accommodation groove configured to accommodate the terminal portion may be formed on a lateral surface of the base.

In another general aspect of the present disclosure, there is provided a camera module, the camera module comprising: a lens unit; a bobbin configured to accommodate the lens unit at an inner side thereof and having a first coil unit arranged at an outer side thereof; a magnet unit facing an outer lateral surface of the first coil unit; a housing configured to accommodate the magnet unit and having a hole formed on the housing; a base configured to support the housing; a cover member configured to accommodate a mover and a actuator by being coupled to the base; and a printed circuit board configured to apply electrical power to the first coil unit by being arranged at a lower portion of the base.

In still another general aspect of the present disclosure, there is provided a lens actuating unit, the lens actuating unit comprising: a mover including a first coil unit; a magnet unit having an inner lateral surface thereof facing an outer lateral surface of the first coil unit so as to move the mover; a housing having the magnet unit arranged at the housing; an actuator including a second coil unit arranged to face a lower lateral surface of the magnet unit so as to move the housing; a base configured to support the mover and the actuator; a cover member configured to accommodate the mover and the actuator; and a circuit board formed by being downwardly bent from a lateral surface of the circuit board portion and having at least one lateral surface thereof including a terminal portion and a fixation portion.

In some exemplary embodiments of the present disclosure, the terminal portion may be electrically connected to the circuit board portion, and the fixation portion may be formed as a non-conductive material formed by being extended from the terminal portion.

In some exemplary embodiments of the present disclosure, at least one through hole may be formed on the fixation portion.

In some exemplary embodiments of the present disclosure, the terminal portion may be formed in a same height as or longer than a height of a lateral surface of the base.

In some exemplary embodiments of the present disclosure, an accommodation groove configured to accommodate the terminal portion may be formed on a lateral surface of the base.

In some exemplary embodiments of the present disclosure, the cover member may further include an extension portion formed by being extended at a lower lateral surface of the cover member so as to correspond to an outer lateral surface of the fixation portion.

In still another general aspect of the present disclosure, there is provided a camera module, the camera module comprising: a lens unit; a mover including a first coil unit, the lens unit fixed to the mover; a magnet unit having an inner lateral surface thereof facing an outer lateral surface of the first coil unit so as to move the mover; a housing having the magnet unit arranged thereat; an actuator including a second coil unit arranged to face a lower lateral surface of the magnet unit so as to move the housing; a base supporting the mover and the actuator; a cover member accommodating the mover and the actuator by being coupled to the base; a circuit board portion arranged between the base and the second coil unit; and a circuit board formed by being downwardly bent from a lateral surface of the circuit board portion and having at least one lateral surface thereof including a terminal portion and a fixation portion.

In some exemplary embodiments of the present disclosure, the camera module may further include a printed circuit board arranged at a lower lateral surface of the base and electrically connected to the terminal portion.

In some exemplary embodiments of the present disclosure, a soldering point for being connected to a terminal of the terminal portion may be formed on the printed circuit board.

In some exemplary embodiments of the present disclosure, an image sensor may be mounted on the printed circuit board.

In still another general aspect of the present disclosure, there is provided a lens actuating unit, the lens actuating unit comprising: a mover including a first coil unit; a magnet unit having an inner lateral surface thereof facing an outer lateral surface of the first coil unit so as to move the mover; a housing having the magnet unit arranged thereat; an actuator including a second coil unit arranged to face a lower lateral surface of the magnet unit so as to move the housing; a circuit board including a circuit board portion electrically connected to the second coil unit, a terminal portion formed by being downwardly bent from a lateral surface of the circuit board portion, and a fixation portion having at least one lateral surface thereof formed by being extended from the terminal portion; a base supporting the mover and the actuator, and having a protrusion formed by being protruded corresponding to the fixation portion on a lower lateral surface of the base; and a cover member accommodating the mover and the actuator by being coupled to the base.

Meanwhile, in still another general aspect of the present disclosure, there is provided a camera module, the camera module comprising: a lens unit; a mover including a first coil unit, the lens unit fixed to the mover; a magnet unit having an inner lateral surface thereof facing an outer lateral surface of the firsts coil unit so as to move the mover; a housing having the magnet unit arranged thereat; an actuator including a second coil unit arranged to face a lower lateral surface of the magnet unit so as to move the housing; a circuit board including a circuit board portion electrically connected to the second coil unit, a terminal portion formed by being downwardly bent from a lateral surface of the circuit board portion, and a fixation portion having at least one lateral surface thereof formed by being extended from the terminal portion; a base supporting the mover and the actuator, and having a protrusion formed by being protruded corresponding to the fixation portion on a lower lateral surface of the base; and a cover member accommodating the mover and the actuator by being coupled to the base.

In some exemplary embodiments of the present disclosure, the terminal portion may be electrically connected to the circuit board portion, and the fixation portion may be formed as a non-conductive material formed by being extended from the terminal portion.

In some exemplary embodiments of the present disclosure, at least one through hole may be formed on the fixation portion.

In some exemplary embodiments of the present disclosure, the terminal portion may be formed in a same height as or longer than a height of the protrusion.

In some exemplary embodiments of the present disclosure, an accommodation groove configured to accommodate the terminal portion may be formed on a lateral surface of the base, and the protrusion may be formed on a lower lateral surface of the accommodation groove.

In some exemplary embodiments of the present disclosure, the protrusion may include an introduction groove on a surface contacting the fixation portion or on a lower lateral surface such that an adhesive can be introduced in the introduction groove.

In some exemplary embodiments of the present disclosure, the camera module may further include a printed circuit board electrically connected to the terminal portion by being arranged at a lower lateral surface of the base.

In some exemplary embodiments of the present disclosure, a soldering point for being connected to a terminal of the terminal portion may be formed on the printed circuit board.

In some exemplary embodiments of the present disclosure, an image sensor may be mounted on the printed circuit board.

In still another general aspect of the present disclosure, there is provided a lens actuating unit, the lens actuating unit comprising: a bobbin configured to accommodate a lens module at an inner side of the bobbin; a first coil unit disposed at the bobbin; a housing disposed at an outer side of the bobbin; and a magnet unit configured to move the first coil unit through electromagnetic interaction with the first coil unit, wherein the magnet unit may be disposed at an inner lateral surface of the housing, and the housing may accommodate the magnet unit to support an upper surface and a lower surface of the magnet unit.

In some exemplary embodiments of the present disclosure, the housing may include a hole formed by being recessed from an inner side to an outer side to accommodate the magnet unit, and the housing may accommodate the magnet unit to allow exposing only an inner lateral surface of the magnet unit accommodated in the hole.

In some exemplary embodiments of the present disclosure, the housing may have surface-to-surface contacts with all surfaces of the magnet unit except for an inner lateral surface of the magnet unit.

In some exemplary embodiments of the present disclosure, the magnet unit may include a hexahedral magnet, and the housing may contact five surfaces of the hexahedral magnet accommodated in the housing.

In some exemplary embodiments of the present disclosure, an adhesive may be disposed at a contact part between the housing and the magnet.

In some exemplary embodiments of the present disclosure, the housing may include a hole formed by being recessed from an inner side to an outer side to accommodate the magnet unit, and the housing may include an adhesive introduction hole disposed on a surface forming the hole.

In some exemplary embodiments of the present disclosure, an adhesive introduced through the adhesive introduction hole may be introduced between the housing and the magnet.

In some exemplary embodiments of the present disclosure, the magnet unit may be disposed at a corner portion formed by two adjacent lateral surfaces of the housing.

In some exemplary embodiments of the present disclosure, the lens actuating unit may further comprise: a base disposed at a lower portion of the housing; and a second coil unit disposed at the base and configured to move the magnet unit through electromagnetic interaction with the magnet unit.

In some exemplary embodiments of the present disclosure, the lens actuating unit may further comprise: an upper spring and a lower spring configured to elastically connect the bobbin and the housing; and a lateral spring configured to elastically connect the housing and the base.

In still another general aspect of the present disclosure, there is provided a lens actuating unit, the lens actuating unit comprising: a bobbin configured to accommodate a lens module at an inner side of the bobbin; a first coil unit disposed at the bobbin; a housing disposed at an outer side of the bobbin; a magnet unit configured to move the first coil unit through electromagnetic interaction with the first coil unit; a base disposed at a lower portion of the housing; a circuit board disposed at the base; and a second coil unit disposed at the circuit board and configured to move the magnet unit through electromagnetic interaction with the magnet unit, wherein the circuit board may include a circuit board portion, a terminal portion formed by allowing the circuit board portion to be downwardly bent, and a fixation portion formed by allowing the circuit board portion to be downwardly bent and disposed at an outer side of the terminal portion.

In some exemplary embodiments of the present disclosure, the terminal portion may be electrically connected to the circuit board portion, and the fixation portion may be non-conductive.

In some exemplary embodiment of the fixation portion may be provided in plural number, and the terminal portion may be disposed between the plurality of the fixation portions.

In some exemplary embodiments of the present disclosure, the lens actuating unit may further comprise a cover member coupled to an upper portion of the base and configured to accommodate the bobbin and the housing in an internal space of the cover member, wherein the cover member may include an accommodation portion formed by being downwardly extended from a lateral surface, and the accommodation portion may guide the terminal portion to be downwardly bent.

In some exemplary embodiments of the present disclosure, the lens actuating unit may further comprise a cover member coupled to an upper portion of the base and configured to accommodate the bobbin and the housing in an internal space of the cover member, wherein the cover member may include an extension portion formed by being downwardly extended from a lateral surface, and the fixation portion may be fixed to the extension portion.

In some exemplary embodiments of the present disclosure, at least one through hole may be formed on the fixation portion, and an adhesive introduced through the through-hole may be introduced between the fixation portion and the extension portion.

In some exemplary embodiments of the present disclosure, the terminal portion may be formed in a same height as or longer than a height of a lateral surface of the base.

In some exemplary embodiments of the present disclosure, an accommodation groove configured to accommodate the terminal portion and the fixation portion may be formed on a lateral surface of the base.

In some exemplary embodiments of the present disclosure, the base may include a protrusion downwardly extended from a lower surface of the base, and the fixation portion may be fixed to the protrusion.

In some exemplary embodiments of the present disclosure, at least one surface of the protrusion may have a shape corresponding to that of the fixation portion.

In some exemplary embodiments of the present disclosure, at least one through-hole may be formed on the fixation portion, and an adhesive introduced through the through-hole may be introduced between the fixation portion and the protrusion.

In some exemplary embodiments of the present disclosure, the protrusion may include an introduction groove on a surface contacting the fixation portion or on a lower lateral surface such that an adhesive can be introduced in the introduction groove.

In still another general aspect of the present disclosure, there is provided a camera module, the camera module comprising: a lens module; a bobbin configured to accommodate the lens module at an inner side of the bobbin; a first coil unit disposed at the bobbin; a housing disposed at an outer side of the bobbin; a magnet unit configured to move the first coil unit through electromagnetic interaction with the first coil unit; a base disposed at a lower portion of the housing; a circuit board disposed at the base; and a second coil unit disposed at the circuit board and configured to move the magnet unit through electromagnetic interaction with the magnet unit, wherein the circuit board may include a circuit board portion, a terminal portion formed by allowing the circuit board portion to be downwardly bent, and a fixation portion formed by allowing the circuit board portion to be downwardly bent and disposed at an outer side of the terminal portion.

In still another general aspect of the present disclosure, there is provided an optical apparatus, the optical apparatus comprising a main body, a display unit configured to display information by being arranged at a surface of the main body, and a camera module configured to photograph a picture or motion picture by being installed at the main body, wherein the camera module may include: a lens module; a bobbin configured to accommodate the lens module at an inner side of the bobbin; a first coil unit disposed at the bobbin; a housing disposed at an outer side of the bobbin; a magnet unit configured to move the first coil unit through electromagnetic interaction with the first coil unit; a base disposed at a lower portion of the housing; a circuit board disposed at the base; and a second coil unit disposed at the circuit board and configured to move the magnet unit through electromagnetic interaction with the magnet unit, wherein the circuit board may include a circuit board portion, a terminal portion formed by allowing the circuit board portion to be downwardly bent, and a fixation portion formed by allowing the circuit board portion to be downwardly bent and disposed at an outer side of the terminal portion.

According to an exemplary embodiment of the present disclosure, the drop out of magnets from the housing may be minimized, even in a case when an external impact is applied to the lens actuating unit.

In addition, according to an exemplary embodiment of the present disclosure, the structure of the terminal portion of the circuit board, the cover member and the base may be improved, and thereby the operation reliability of the lens actuating unit can be enhanced.

DETAILED DESCRIPTION

Unless defined otherwise herein, all technical and scientific terms used herein have the same meaning as commonly understood by one of ordinary skill in the art to which this invention belongs. In a case when a term used herein conflicts with the customary meaning of the corresponding term, the meaning of the term defined herein shall supersede the customary meaning.

However, the terms mentioned herein are used merely for description of a particular exemplary embodiment. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

Hereinafter, an optical apparatus according to an exemplary embodiment of the present disclosure will be described.

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to an exemplary embodiment may include a main body (not illustrated in the drawings), a display unit (not illustrated in the drawings) configured to display information by being arranged at a surface of the main body, and a camera (not illustrated in the drawings) having a camera module (not illustrated in the drawings) configured to photograph a picture or motion picture by being installed at the main body.

Hereinafter, a structure of the camera module will be described.

The camera module may include a lens actuating unit (not illustrated in the drawings), a lens module (not illustrated in the drawings), an infrared cut-off filter (not illustrated in the drawings), a printed circuit board (not illustrated in the drawings), an image sensor (not illustrated in the drawings), and a controller (not illustrated in the drawings).

The lens module may include at least one lens (not illustrated in the drawings) and a lens barrel accommodating the at least one lens. However, one structure of the lens module is not limited to the lens barrel, but any kind of holder structure capable of supporting the at least one lens may be available. The lens module may move along with a lens actuating unit by being coupled to the lens actuating unit. As an example, the lens module may be screw-coupled to the lens actuating unit. Meanwhile, light that has passed through the lens module may be irradiated to an image sensor.

The infrared cut-off filter may block light in an infrared area from being incident to the image sensor. As an example, the infrared cut-off filter may be disposed between the lens module and the image sensor. The infrared cut-off filter may be installed at a base (350) to be described hereinafter. The infrared cut-off filter may be coupled to a holder member (not illustrated in the drawings). The infrared cut-off filter may be installed at a through-hole (351) formed on a center portion of the base (350). As an exemplary embodiment, the infrared cut-off filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

The printed circuit board may support the lens actuating unit. The image sensor may be mounted on the printed circuit board. More particularly, the lens actuating unit may be disposed at an outer side of an upper surface of the printed circuit board, and the image sensor may be disposed at an inner side of an upper surface of the printed circuit board. Through such structure, the light that has passed through the lens module coupled at an inner side of the lens actuating unit may be irradiated to the image sensor mounted on the printed circuit board. The printed circuit board may supply electric power to the lens actuating unit. Meanwhile, the controller for controlling the lens actuating unit may be disposed at the printed circuit board.

The image sensor may be mounted on the printed circuit board. The image sensor may be disposed to have the same optical axis with the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted on the printed circuit board. Meanwhile, the controller may be disposed at an inner side of the lens actuating unit. The controller may control such as direction, intensity and amplitude of supplied electrical current with respect to each structural element forming the lens actuating unit. The controller may control the lens actuating unit to perform at least any one of auto focus function or handshake compensation function of the camera module. That is, the controller may control the lens actuating unit to move the lens module in a direction of the optical axis or in a direction perpendicular to the optical axis or to tilt the lens module. Furthermore, the controller may perform feedback control of the auto focusing function and the handshake compensation function.

Hereinafter, the structure of the lens actuating unit according to an exemplary embodiment of the present disclosure will be described with reference to the enclosed drawings.

Figure 1:
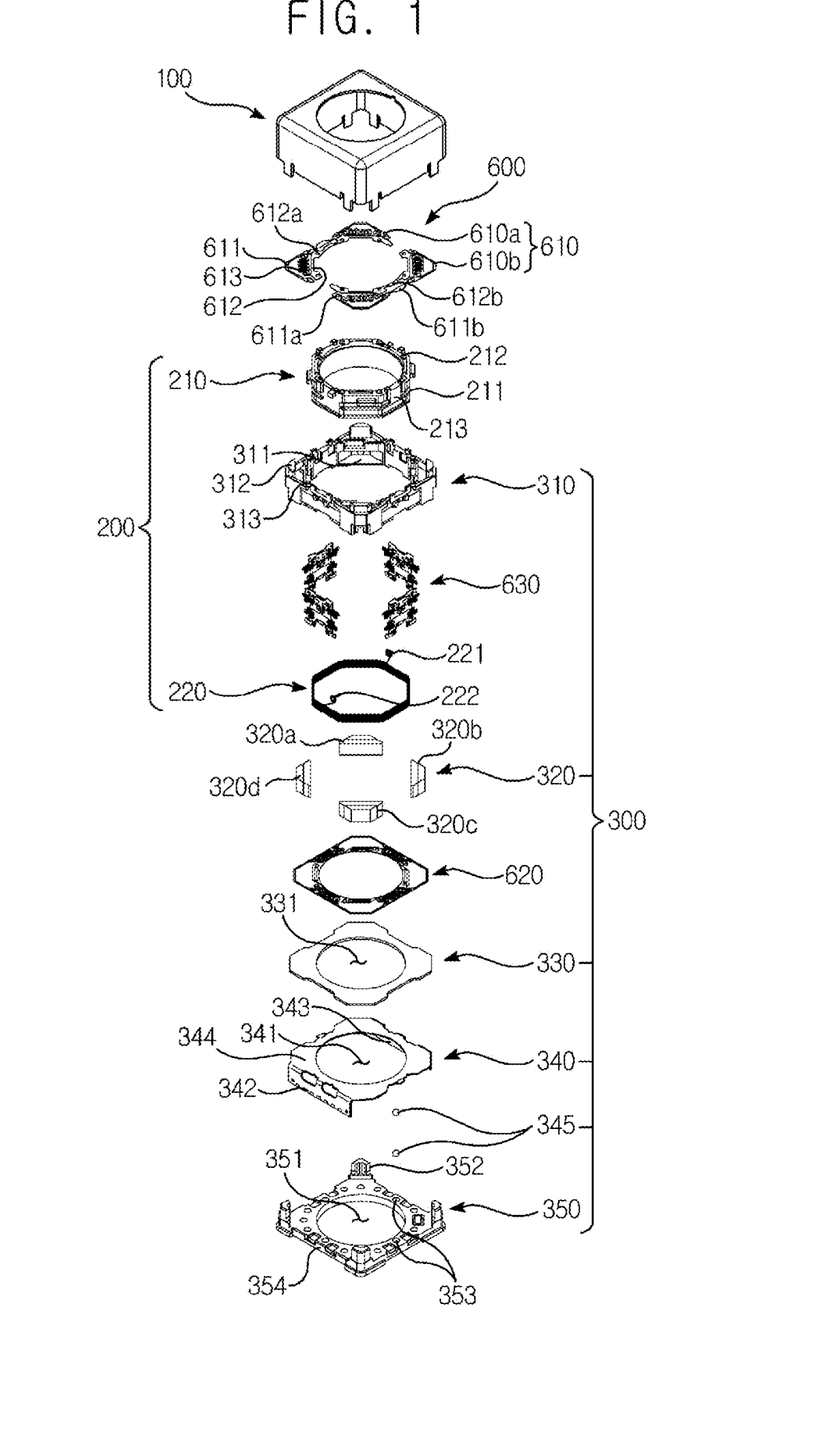
FIG. 1 is an exploded perspective view illustrating a lens actuating unit according to an exemplary embodiment of the present disclosure.
Figure 2:
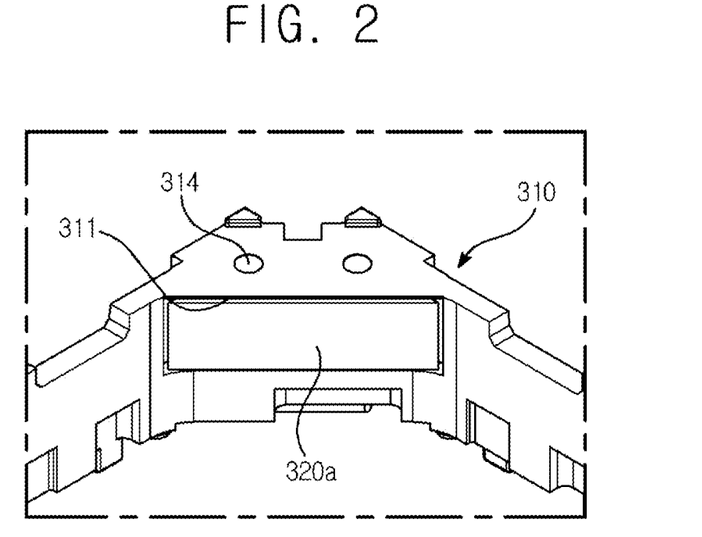
FIG. 2 is a partial perspective view illustrating a housing of a lens actuating unit according to an exemplary embodiment of the present disclosure.
Figure 3:
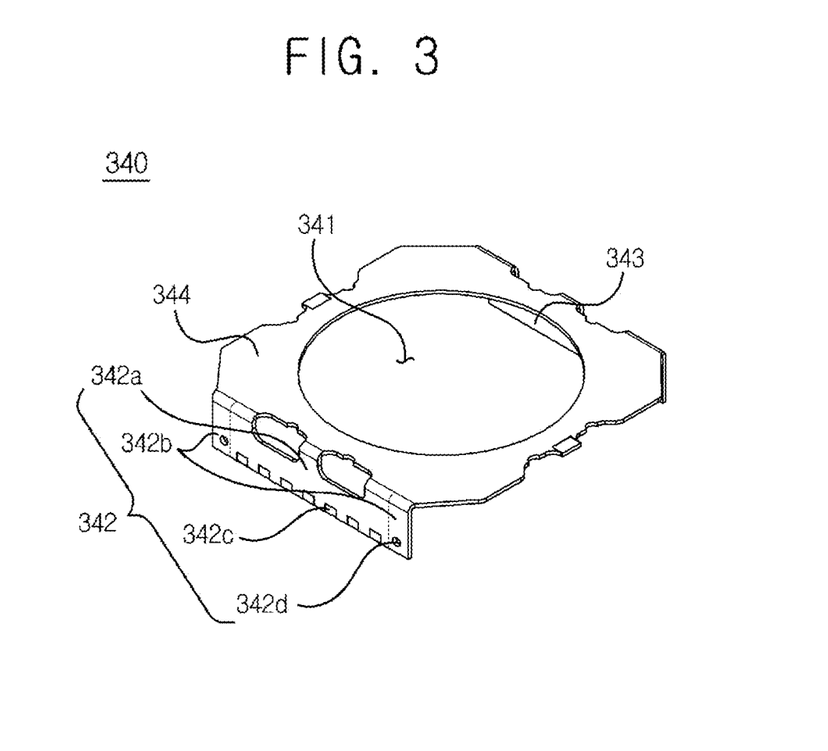
FIG. 3 is a perspective view illustrating a circuit board of a lens actuating unit according to an exemplary embodiment of the present disclosure.
Figure 4:
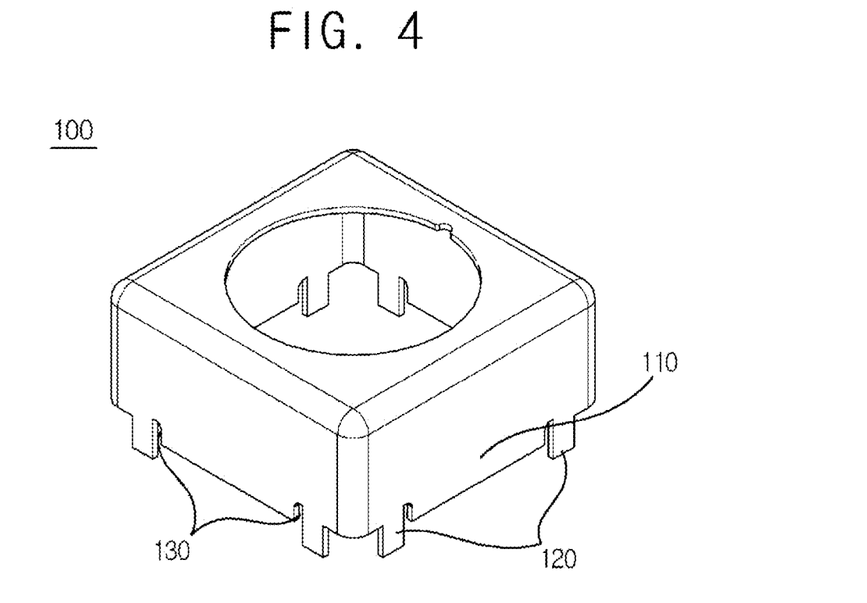
FIG. 4 is a perspective view illustrating a cover member of a lens actuating unit according to an exemplary embodiment of the present disclosure.
Figure 5:
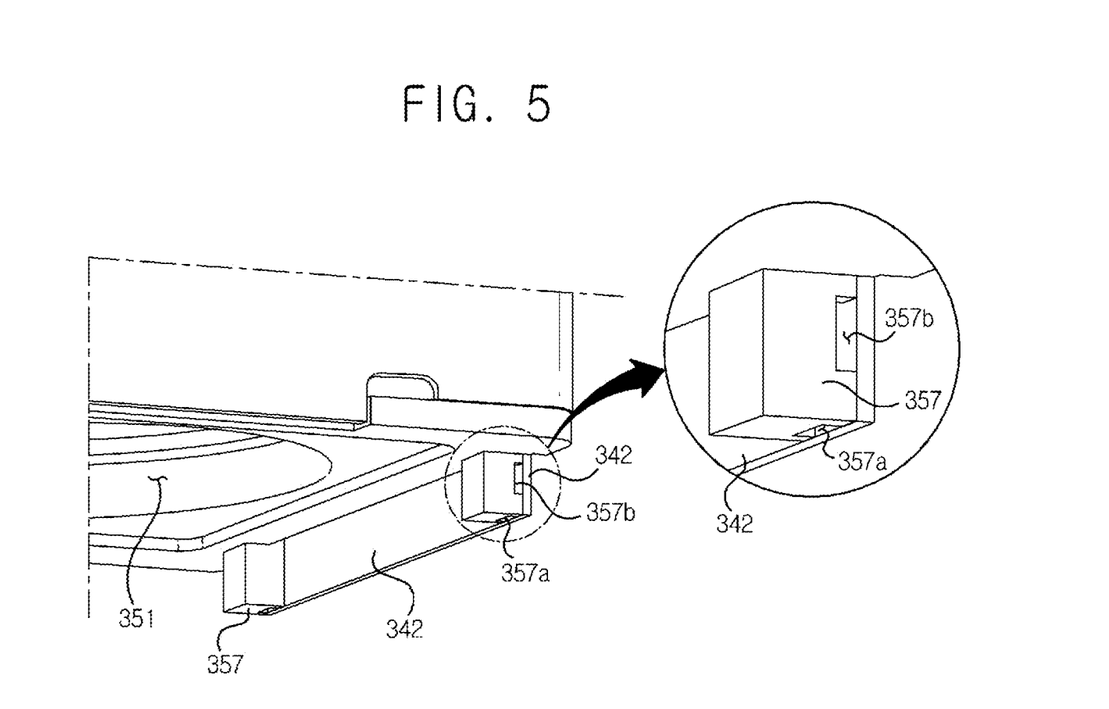
FIG. 5 is a partial perspective view illustrating parts of a base and a circuit board of a lens actuating unit according to an exemplary embodiment of the present disclosure.

FIG. 1 is an exploded perspective view illustrating a lens actuating unit according to an exemplary embodiment of the present disclosure; FIG. 2 is a partial perspective view illustrating a housing of a lens actuating unit according to an exemplary embodiment of the present disclosure; FIG. 3 is a perspective view illustrating a circuit board of a lens actuating unit according to an exemplary embodiment of the present disclosure; FIG. 4 is a perspective view illustrating a cover member of a lens actuating unit according to an exemplary embodiment of the present disclosure; and FIG. 5 is a partial perspective view illustrating parts of a base and a circuit board of a lens actuating unit according to an exemplary embodiment of the present disclosure.

Referring to FIG. 1, the lens actuating unit may include a mover (200), an actuator (300), a cover member (100) and an elastic member (600). However, according to an exemplary embodiment of the present disclosure, at least one of include the mover (200), the actuator (300), the cover member (100) and the elastic member (600) may be omitted from the structure of the lens actuating unit.

The cover member (100) may accommodate the mover (200), the actuator (300) and the elastic member (600). The cover member (100) may form an external appearance of the lens actuating unit. The cover member (100) may be formed in a shape of a rectangular parallelepiped where an opening is formed on an upper surface thereof and a lower surface thereof is opened. However, the shape of the cover member (100) is not limited hereto. As an example, the cover member (100) may be in a shape of a quadrangle or an octagon when viewed from the above.

The cover member (100) may be coupled to the base (350) with an inner lateral surface of the cover member (100) closely adhered to an accommodation groove (354) of the base (350). The cover member (100) may protect internal components from external impacts as well as inhibit penetration of external pollutants.

The cover member (100) may also protect internal components of the camera module from external radio wave interferences generated by the optical apparatus. Therefore, the cover member (100) may be formed of a metallic material such as iron or aluminum. In addition, the cover member (100) may be plated with metal such as nickel in order to inhibit corrosion.

The cover member (100) may be implemented as a yoke unit, or otherwise, may be fixed by molding the yoke unit on an inner side of the cover member (100). As an example, an inner yoke (not illustrated in the drawings) may be formed on an inner side of an upper lateral surface of the cover member (100). The inner yoke may be disposed at an introduction portion (213) formed on the bobbin (210). In such case, the inner yoke may be arranged at an edge around an opening on an upper lateral surface of the yoke unit, or may be arranged at a lateral surface of the yoke unit. The introduction portion (213) of the bobbin (210) may be disposed at a position responding to the inner yoke.

The cover member (100) may include an accommodation portion (110) where a portion corresponding to an accommodation groove (354) among a surface coupled to the base (350) is downwardly extended at a predetermined interval. The accommodation portion (110) may induce a terminal portion (342) of a circuit board (340) to be naturally bent when the cover member (100) is inserted to the base (350).

The cover member (100) may further include an extension portion (120) formed by being extended on a lower lateral surface of the cover member (100) so as to respond to an outer lateral surface of a fixation portion (342b). More particularly, the extension portion (120) may be formed by being extended on both or one side of the accommodation portion (110). Otherwise, the extension portion (120) may be formed by being extended at both or one side of the accommodation portion (110) by being spaced at a predetermined interval. In the latter case, a separation portion (130) may be formed between the accommodation portion (110) and the extension portion (120) by being introduced toward an upper portion of the cover member (100).

The extension portion (120) may be formed by being extended from the cover member (100) in a size corresponding to height and/or width of the fixation portion (342b). The height of the extension portion (120) may be formed the same as or higher than that of an exposed portion of a lateral surface of the base (350) when mounting the cover member (100) on the base (350). An inner lateral surface of the extension portion (120) may be strongly fixed to an outer lateral surface of the fixation portion (342b), thereby to stabilize fixation of the terminal portion (342).

The mover (200) may move while accommodating a lens or a lens unit (not illustrated in the drawings). The mover (200) may include a bobbin (210) and a first coil unit (220).

The bobbin (210) may accommodate inside thereof a lens unit. More particularly, coupling of the lens unit and the bobbin (210) may be made by screw threads respectively formed on an inner circumferential surface of the bobbin (201) and an outer circumferential surface of the lens unit. Otherwise, the coupling of the lens unit and the bobbin (210) may be made by a non-screw thread method using adhesive. Of course, the adhesive may be used after coupling of screw threads in a screw thread method.

A guide portion (211) may be formed on an outer circumferential surface of the bobbin (210). The guide portion (211) may guide the first coil unit (220) to be wound or installed on the bobbin (210). The guide portion (211) may be continuously formed along an outer circumferential surface of the bobbin (210), or may be formed by being spaced at a predetermined interval along the outer circumferential surface of the bobbin (210).

An inner lateral portion coupling protrusion (212) may be formed on an upper lateral surface and/or a lower lateral surface of the bobbin (210). An upper spring (610) and/or a lower spring (620) provided so as to support the bobbin (210) at an upper portion of the bobbin (210) may be coupled to the inner lateral portion coupling protrusion (212).

The bobbin (210) may further include an introduction portion (213) that is formed on an outer circumferential surface of the bobbin (210) so that the inner yoke of the cover member (100) can be disposed between the bobbin (210) and the first coil unit (220) wound on the bobbin (210).

The first coil unit (220) may be arranged at an outer lateral surface of the bobbin (210). More particularly, the first coil unit (220) may be wound on an outer lateral surface of the bobbin (210) by being guided by the guide portion (211). In addition, the first coil unit (220) may be formed by a process where a pre-wound coil unit is mounted on the guide portion (211). Otherwise, four separate coils (not illustrated in the drawings) may be arranged on an outer lateral surface of the bobbin at 90-degree interval. The first coil unit (220) may form an electromagnetic field by receiving an electric power applied by a printed circuit board (not illustrated in the drawings).

The actuator (300) may move the mover (200). The actuator (300) may include a housing (310), a magnet unit (320), a second coil unit (330), a circuit board (340) and a base (350). Here, at least one of the housing (310), the magnet unit (320), the second coil unit (330), the circuit board (340) and the base (350) may be omitted.

The housing (310) may be formed in a shape corresponding to that of an inner lateral surface of the cover member (100). Otherwise, the housing (310) may form an external appearance of the lens actuating unit by being integrally formed with the cover member (100), without being separately provided.

The housing (310) may be supported by the base (350) and may internally accommodate the bobbin (210). The housing (310) may be formed in a hexahedral shape in response to a shape of the cover member (100). The housing (310) may support the mover (200) with the upper and lower portions thereof open.

The housing (310) may include a hole (311) formed in a shape responding to that of the magnet unit (320) at a lateral surface of the housing (310). The hole (311) may be formed on the housing, by being provided in a number corresponding to that of magnets (320a, 320b, 320c, 320d) of the magnet unit (320).

Conventionally, an upper surface or a lower surface of the magnets accommodated in the housing is exposed. In such conventional structure, a tolerance due to difference in size of each magnet itself according to the characteristic of being manufactured by grinding a grindstone, or due to difference in height by an adhesive is concerned to occur. Such tolerance is concerned to cause imbalance in magnetic force.

For example, the following Table 1 describes results of measuring height of each magnet accommodated in a housing of the conventional structure. The unit of height is μm.

TABLE 1

|  | first magnet | second magnet | third magnet | fourth magnet | Max-min | Standard deviation |
| --- | --- | --- | --- | --- | --- | --- |
| Sample 1 | 3.017 | 3.023 | 3.011 | 3.010 | 0.013 | 0.006 |
| Sample 2 | 3.011 | 3.004 | 3.011 | 3.007 | 0.007 | 0.003 |
| Sample 3 | 3.005 | 2.994 | 3.013 | 3.009 | 0.019 | 0.008 |
| Sample 4 | 3.004 | 2.997 | 3.008 | 3.019 | 0.022 | 0.009 |
| Sample 5 | 3.018 | 3.027 | 3.019 | 3.015 | 0.012 | 0.005 |
| Sample 6 | 3.016 | 3.014 | 3.023 | 3.019 | 0.009 | 0.004 |
| Sample 7 | 3.000 | 3.003 | 3.009 | 3.007 | 0.009 | 0.004 |
| Sample 8 | 3.020 | 3.019 | 3.029 | 3.012 | 0.017 | 0.007 |
| Sample 9 | 3.022 | 3.037 | 3.002 | 2.997 | 0.040 | 0.018 |
| Sample 10 | 3.012 | 3.001 | 3.007 | 2.993 | 0.019 | 0.008 |
| Sample 11 | 3.010 | 3.035 | 3.013 | 3.004 | 0.031 | 0.014 |
| Sample 12 | 3.012 | 3.029 | 3.018 | 3.007 | 0.022 | 0.009 |
| Sample 13 | 3.006 | 3.010 | 3.016 | 3.006 | 0.010 | 0.005 |
| Sample 14 | 3.024 | 3.018 | 3.001 | 3.013 | 0.023 | 0.010 |
| Sample 15 | 3.032 | 3.020 | 3.062 | 3.025 | 0.042 | 0.019 |
| Sample 16 | 3.012 | 3.017 | 3.008 | 3.037 | 0.029 | 0.013 |
| Sample 17 | 3.011 | 3.017 | 3.020 | 3.001 | 0.019 | 0.008 |
| Sample 18 | 3.039 | 3.026 | 3.017 | 2.998 | 0.041 | 0.017 |
| Sample 19 | 3.033 | 3.019 | 3.006 | 3.007 | 0.027 | 0.013 |
| Sample 20 | 3.034 | 3.020 | 3.002 | 3.007 | 0.032 | 0.014 |
| Sample 21 | 3.002 | 3.007 | 3.011 | 3.008 | 0.009 | 0.004 |
| Sample 22 | 3.007 | 3.009 | 3.028 | 3.001 | 0.027 | 0.012 |
| Sample 23 | 3.060 | 3.013 | 3.004 | 2.994 | 0.066 | 0.029 |
| Sample 24 | 3.004 | 3.000 | 3.006 | 2.990 | 0.016 | 0.007 |
| Sample 25 | 3.002 | 3.005 | 3.012 | 3.000 | 0.012 | 0.005 |
| Sample 26 | 3.045 | 3.012 | 3.006 | 3.006 | 0.039 | 0.019 |
| Sample 27 | 3.007 | 3.029 | 2.995 | 3.010 | 0.034 | 0.014 |
| Sample 28 | 3.037 | 3.025 | 3.005 | 3.001 | 0.036 | 0.017 |
| Sample 29 | 3.021 | 3.018 | 3.012 | 3.000 | 0.021 | 0.009 |
| Sample 30 | 3.011 | 3.011 | 3.016 | 3.007 | 0.009 | 0.004 |
|  |  |  |  | Average | 0.024 | 0.011 |

When referring the above Table 1, for example, the difference in height (max-min) of sample 23 is considerably significant in comparison with the average value. Such difference in height causes imbalance in magnetic force.

According to an exemplary embodiment of the present disclosure, the upper and lower surfaces of the magnet are allowed to contact the housing. Thereby the tolerance may be minimized, and attachment fault and/or detachment fault of the magnet which may occur during dropping or tumble test may be inhibited. In addition, the area where the magnet is exposed to outside may be minimized, thereby adherence of foreign materials due to static electricity may be inhibited.

The hole (311) may be formed at each edge of the housing (310). In addition, the hole (311) may be formed at each inner lateral surface of the housing (310).

Referring to FIG. 2, the hole (311) may be formed so as to accommodate all surfaces of each of the magnets (320a, 320b, 320c, 320d) except for a surface facing the first coil unit (220) (that is, an inner lateral surface of the magnet).

The hole (311) may be formed so as to correspond to a shape and/or size of the magnet (320a, 320b, 320c, 320d). In addition, an adhesive such as epoxy may be coated on a part or a whole of a contact surface between the hole (311) and the magnet (320a, 320b, 320c, 320d) so that more concrete coupling and/or more precise coupling may be implemented.

According to an exemplary embodiment of the present disclosure, a structure where the magnets (320a, 320b, 320c, 320) are concretely and precisely fixed to the housing (310) is provided. Therefore, the electromagnetic interaction with the first coil unit (220) becomes precise, and adherence of foreign materials can be minimized. Thereby, a superior actuator may be implemented.

Referring to FIG. 2, at least one adhesive introduction hole (314) may be formed on at least one surface forming the hole (311). An adhesive may be readily introduced through the adhesive introduction hole (314). The adhesive introduction hole (314) may be formed in a circular shape, but not limited hereto.

The housing (310) may be formed of an insulated material. The housing (310) may be implemented as an injection molding material, in consideration of productivity.

The housing (310) is a component that move for OIS (Optical Image Stabilization) operation, and may be arranged by being spaced from the cover member (100) at a predetermined interval. The bobbin (210) may move in a direction of an optical axis by mutual interaction of the first coil unit (220) and the magnet unit (320). The housing (310) may move in a direction perpendicular to the optical axis by mutual interaction between the second coil unit (330) and the magnet unit (320).

At least two stoppers that are protruded so as to absorb impact energy of external impacts may be formed on an upper lateral surface of the housing (310) by being spaced at a predetermined interval. The stopper (312) may be integrally formed with the housing (310), and may be formed on the bobbin (210). Meanwhile, the stopper (312) may be omitted.

The magnet unit (320) may be arranged to face the first coil unit (220). The magnet unit (320) may be arranged at the housing (310) so that an inner lateral surface of the magnet unit (320) faces an outer lateral surface of the first coil unit (220). Particularly, the magnet unit (320) may be fixed to the housing (310) using an adhesive. The magnet unit (320) may be mounted at four edges of inner lateral surfaces of the housing (320) at a same interval, so that the internal volume of the housing (320) can be efficiently utilized. The magnet unit (320) may be mounted at four edges of inner lateral surfaces of the housing (320) so as to face the first coil unit (220).

Each of the magnets (320a, 320b, 320c, 320d) may be in a shape of a trapeziform pillar. In addition, each of the magnets (320a, 320b, 320c, 320d) may be in a shape of a polyprism such as a trigonal prism or a square pillar. Meanwhile, the magnet (320a, 320b, 320c, 320d) may be formed so that a part of a surface facing the first coil unit (220) in the polyprism shape thereof includes a curved surface. In addition, the magnet (320a, 320b, 320c, 320d) may be formed so that a part of an edge thereof includes a curved surface. Meanwhile, a hole (311) in shape corresponding to that of each magnet (320a, 320b, 320c, 320d) may be formed at the housing (310).

The second coil unit (330) may be arranged at the base (350) so as to face the magnet unit (320). Particularly, the second coil unit (330) may be mounted on a circuit board (340) provided at an upper surface of the base (350). In addition, the second coil unit (330) may be formed at the circuit board (340). The second coil unit (330) may include a through-hole (331) at a center thereof in order to pass a light signal of the lens unit through. The second coil unit (330) may be formed of a FP coil that is a patterned coil, in consideration of the fact that a height of z-axis (optical axis) is adjusted to be lowered in order to miniaturize the lens actuating unit.

The circuit board (340) may be implemented as a FPCB (Flexible Printed Circuit Board). The circuit board (340) may be implemented as a FPCB (Flexible Printed Circuit Board), in consideration of the fact that a height of z-axis (optical axis) is adjusted to be lowered in order to miniaturize the lens actuating unit.

The printed circuit board (340) may include a circuit board portion (344) arranged between the base (350) and the second coil unit (330), and a terminal portion (342) formed by being downwardly bent from a lateral surface of the circuit board portion (344). The circuit board portion (340) may include a fixation portion (342b) being extended toward one side or both sides of the terminal portion (342). The fixation portion (342b) may be formed of a non-conductive material.

The terminal portion (342) may be formed in a same height as or longer than a height of a lateral surface of the base (350), so as to aim for efficient with the printed circuit board (not illustrated in the drawings).

The circuit board portion (344) and the terminal portion (342) may be patterned or plated so as to be electrically conductive. Particularly, the terminal portion (342) may include a conductive area (342a) having a plurality of terminals (342c) arranged by being electrically connected to the printed circuit board (not illustrated in the drawings) of the terminal portion (342), and a fixation portion (342b) formed at one side or both sides of the conductive area (342a) and coated so as to be non-conductive with the circuit board (340) or having a non-conductive parent metal exposed thereon.

A part of a whole of the fixation portion (342b) may be concretely fixed to an extension portion (120) of the cover member (100), thereby strain of the terminal portion (342) may be inhibited. For the purpose of concrete fixation, at least one through-hole (342d) may be formed at the extension portion (120) of the cover member (100) or at the fixation portion (342b). An adhesive may be introduced in the through-hole (342d) so at to concretely fix the extension portion (120) of the cover member (100) and the fixation portion (342b). The through-hole (342d) may be in a circular shape, but not limited hereto. A protrusion may be formed on the base at a position corresponding to that of the through-hole (342d) and may be coupled or bonding coupled to the through-hole (342d).

The circuit board (340) may be arranged between the second coil unit (330) and the base (350) and may include on a side thereof a terminal portion (342) curvedly formed so as to connect to an external electric power. The terminal portion (342) may be formed by being downwardly (toward the base (350)) bent in order to be soldered to a separate printed circuit board. The terminal portion (342) may be rectangularly bent. The terminal portion (342) may be bent when the cover member (100) is inserted to the base (350). The terminal portion (342) may be formed by being bent so as to drift apart from the cover member (100) as it descends downward. In such case, short-circuit due to the solder may be inhibited.

The circuit board (340) may be provided at an upper portion of the base (350) in order to apply electric power to the second coil unit (330). The circuit board (340) may include a through-hole (341) corresponding to the through-hole (331) of the second coil unit (330).

A Hall sensor unit (345) may be mounted on the circuit board (340). Particularly, the Hall sensor unit (345) may sense intensity and phase of electromagnetic field in order to sense movement of the magnet unit (320). The Hall sensor unit (345) may be provided in order to precisely control the first coil unit (220) and/or the second coil unit (330) by interacting with the circuit board (340). In such case, the circuit board (340) may further include a Hall sensor terminal portion (343) for applying electrical power to the Hall sensor unit (345).

The Hall sensor unit (345) may be provided on a straight line with the magnet unit (320) based on the optical axis direction. The Hall sensor unit (345) may include two Hall sensors provided at each of two edges among the edges of the circuit board (340). In such case, the Hall sensor unit (345) may sense displacement along x-axis and y-axis. That is, each of the Hall sensors (345) disposed at lower portions of two rectangularly adjacent magnets may individually sense positions of magnets (320a, 320b, 320c, 320d) being driven along x-axis or y-axis. In such case, the travel amount of the magnet unit (320) may be readily calculated in complexity.

The Hall sensor unit (345) may be arranged at a lateral surface of the bobbin (210). The Hall sensor unit (345) may be arranged at a bobbin (210) at an inner side of the first coil unit (220). In such case, the Hall sensor unit (345) may be concealed by the first coil unit (220) to be invisible when viewed from the outside. The Hall sensor unit (345) may be arranged at an outer side of the bobbin (220).

The Hall sensor unit (345) may be arranged to be adjacent to the first coil unit (220) or the second coil unit (330) rather than adjacent to the magnet unit (320). However, the electromagnetic field of the first coil unit (220) or the second coil unit (330) is inconsiderable with regard to sensing the movement of the magnet unit (320), in view of the fact that the intensity of electromagnetic field generated from the magnet unit (320) is hundreds of times larger than that of the electromagnetic field generated from the coil.

Due to the independent or systematic interaction the first and/or second coil unit (220/330) and the magnet unit (320), the lens unit (to be described hereinafter) may be omnidirectionally moved to focus an image of an object and compensate handshakes.

Here, the focusing the image may refer to an AF (Auto Focusing) function to move the lens unit in z-axis (optical axis) direction in order for short-distance or long-distance of the object, an OIS (Optical Image Stabilization) function to move the lens unit in x-axis and y-axis directions perpendicular to the z-axis direction in order for handshake compensation, or may refer to a function to simultaneously perform the AF and OIS functions.

That is, an exemplary embodiment of the present disclosure may be implemented as an AF (Auto Focusing) type or an OIS (Optical Image Stabilization) type.

Therefore, although an exemplary embodiment of the OIS type was described in the above, the exemplary embodiment may also be implemented as the AF (Auto Focusing) type that is the former. In such case, the exemplary embodiment may not include the second coil unit (330) and the circuit board (340).

The base (350) may support the mover (200) and the actuator (300). The base (350) may include at a center thereof a through-hole (351) responding to the lens unit. A recessed portion (not illustrated in the drawings) may be formed in a circular shape and downwardly recessed at a center of the base (350) so that the bobbin (210) can be disposed by being spaced.

At least one fixation protrusion (352) configured to surface contact with or to be coupled to an inner lateral surface of the cover member (100) may be formed by being protrude on an upper edge of the base (350). The fixation protrusion (352) may guide the cover member (100) to be readily coupled as well as may facilitate concrete fixation after the coupling.

An accommodation groove (354) accommodating the terminal portion (342) may be formed on a lateral surface of the base (350). The terminal portion (342) may be formed by being introduced in at least one lateral surface of the base (350). In addition, the accommodation groove (354) may be rectangularly or acutely formed as it downwardly descends so as to correspond to the bend angle of the terminal portion (342).

A Hall sensor accommodation groove (353) corresponding to each of the Hall sensors of the Hall sensor unit (345) may be formed on the base (350). It is advantageous for miniaturization of internal height that the Hall sensor is mounted on a lower portion of the circuit board (340).

A protrusion (357) may be formed on a lower portion of the base (350) at a position corresponding to that of an inner lateral surface of the fixation portion (342b). The protrusion (357) may be internally protruded. In addition, the protrusion (357) may effectively inhibit the terminal portion (342) of the circuit board (340) from being bent or cracked, because the protrusion (357) supports the fixation portion (342b) from the inside.

The protrusion (357) may be formed on a lower surface of the accommodation groove (354), because the terminal portion (342) may be accommodated in the accommodation groove (354). The terminal portion (342) should physically contact the printed circuit board in order to be electrically connected to the printed circuit board. Thus, the protrusion (357) may be formed in a same size as or smaller than a size of the terminal portion (342).

In order to concretely support the n introduction groove (357a and/or 357b) in which an adhesive can be introduced may be formed on the protrusion (357) at a surface contacting the fixation portion (342b) and/or at a lower surface of the protrusion (357).

The base (350) may function as a sensor holder to protect the image sensor (not illustrated in the drawings) to be described hereinafter. A filter (not illustrated in the drawings) may be arranged at the base (350). In such case, the filter may be mounted at the through-hole (351) formed at a center of the base (350). An infrared ray filer of a blue filter may be provided as the filter.

Here, the filter (not illustrated in the drawings) may be formed of a film material or a glass material. In addition, the filter may be formed by a process where a kind of infrared cut-off coating material is coated on a flat optical filter such as a cover glass for image plane protection. In addition, a separate sensor holder (not illustrated in the drawings) may be disposed at a lower portion of the base (350).

It will be apparent that the infrared ray may be blocked by a coating process on the lens surface without preparing a separate filter, when the filter is installed at an outer side of the lens.

The actuator (300) according to an exemplary embodiment of the present disclosure may further include an elastic unit (600).

The elastic unit (600) may include an upper spring (610), a lower spring (620) and a lateral spring (630).

The upper spring (610) and the lower spring (620) may be implemented as separate springs arranged at each side portion of the housing (310). In addition, the upper spring (610) and the lower spring (620) may be implemented as a leaf spring in a shape where a single board material is bent and cut in consideration of production efficiency.

The upper spring (610) may be arranged at an upper portion of the housing (310). The upper spring (610) may be protruded from an opening formed on an upper portion of the hosing (310) in an optical axis direction at a predetermined height. A protruded portion of the upper spring (610) may support an upper end portion of the bobbin (210). That is, the upper spring (610) may support the bobbin (210) by being coupled to an upper surface of the housing (310) and an upper portion of the bobbin (210). The upper spring (610) may be connected to an upper end portion of the housing (310) in order to provide resetting force when the bobbin (210) is upwardly moved.

In particular, the upper spring (610) may include a first upper spring (610a) where an electric power applied from the printed circuit board is inflowed, and a second upper spring (610b) where the applied electric power is outflowed by being conducted with a first coil pattern unit.

The first upper spring (610a) and the second upper spring (610b) may be formed in a shape symmetrical with respect to the optical axis, and may be formed as a single leaf spring. Otherwise, each of the first upper spring (610a) and the second upper spring (610b) may be formed as a separate leaf spring for input/output of the electric power.

Each of the first upper spring (610a) and the second upper spring (610b) may include an external portion (611) coupled to the housing (310), an internal portion (612) coupled to the bobbin (210), and a connection portion (613) elastically connecting the external portion (611) with the internal portion (612). Here, the connection portion (613) may include at least one bending portion.

In order for coupling of the upper spring (610), at least one external portion coupling protrusion (313) may be formed on an upper surface of the housing (310). An external portion coupling hole (611a) formed corresponding to the external portion coupling protrusion (313) may be formed on the external portion (611). In addition, an external protrusion portion (611b) to be electrically connected to two lateral springs (630) to be described hereinafter may be formed on the external portion (611). Meanwhile, in order for coupling of the upper spring (610), at least one internal portion coupling protrusion (212) may be formed on an upper surface of the bobbin (210). An internal portion coupling hole (612a) formed corresponding to the internal portion coupling protrusion (212) may be formed on the internal portion (612).

An internal protrusion portion (612b) to be electrically connected to one end (221) and the other end (222) of the coil wound on the first coil unit (220) may be formed on each of the internal portions (612) of the first upper spring (610a) and the second upper spring (610b), respectively.

The external protrusion portion (611b) may be electrically connected to the lateral spring (630) by soldering. The internal protrusion portion (612) may be electrically connected to one end (221) and the other end (222) of the coil by soldering.

The external portion (611) of the lower spring (620) may be supported by an upper surface of the base (350). The internal portion (612) may support a lower end portion of the bobbin (210). The lower spring (620) may be formed as a single leaf spring, because the electric power of the printed circuit board (to be described hereinafter) is not inputted/outputted.

In order for vibration attenuation of x and y-axis, one side of the lateral spring (630) may be coupled to a lateral surface of the housing (310) and the other side of the lateral spring (630) may be coupled to a lateral surface of the base (310). The lateral spring (630) may be provided as four lateral spring forming a predetermined interval at 90 degrees.

A damper member (not illustrated in the drawings) may be coated on a commissure between the leaf spring (630) and the housing (310) and/or the base (350). The damper member may be implemented as an epoxy material in a state of sol or gel. The damper member may function to absorb impact energy by being coated between the leaf spring (630) and the housing (310) and/or the base (350).

The lens actuating unit according to an exemplary embodiment of the present disclosure may be installed at a camera module. Such camera module may be provided in a wide variety of multimedia field such as notebook personal computers, camera-equipped mobile phones, PDAs, or smart toys, and even for surveillance cameras or image input devices such as information terminals of video tape recorders.

When the lens actuating unit according to an exemplary embodiment of the present disclosure is provided to a camera module, the camera module may be formed by further including the unillustrated components such as the lens unit, the printed circuit board and/or the image sensor.

The lens unit (not illustrated in the drawings) may be a lens barrel, but not limited hereto. Thus, any holder structure which is able to support a lens may be included. An exemplary embodiment of a case when the lens unit is a lens barrel is given in the following.

The lens unit may be installed at an upper portion of the printed circuit board (to be described hereinafter), and arranged at a portion corresponding to that of the image sensor. Such the lens unit may hold at least one lens.

An image sensor (not illustrated in the drawings) may be installed in the middle of upper side of the printed circuit board (not illustrated in the drawings), on which a variety of components configured to drive the camera module may be installed. In addition, the printed circuit board may be electrically connected to the terminal portion (342), the lower spring (620) or the upper spring (610), or otherwise may be electrically connected directly to the first coil unit (220) and/or the second coil unit (330), in order to apply an electrical power source to drive the lens actuating unit according to an exemplary embodiment of the present disclosure.

In addition, a soldering point may be formed on the printed circuit board in order to apply an electric power to the terminal portion (342).

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims and equivalents thereof.

What is claimed is:

1. A lens actuating unit, comprising:
a cover member comprising an upper plate and a lateral plate extending from the upper plate;
a bobbin disposed in the cover member;
a housing disposed between the cover member and the bobbin;
a base coupled with the lateral plate of the cover member;
a first coil disposed above the base;
a magnet disposed above the base and spaced apart from the first coil;
a circuit board disposed on the base; and
a second coil disposed on an upper surface of the circuit board and facing the magnet,
wherein the circuit board comprises a circuit board portion disposed on an upper surface of the base, and a terminal portion downwardly extending from an edge of the circuit board portion,
wherein the terminal portion comprises first and second fixation portions, and a plurality of terminals formed of a conductive material and disposed between the first and second fixation portions,
wherein the first and second fixation portions are fixed to the base by an adhesive,
wherein the base comprises a step portion protruding from an outer lateral surface of the base,
wherein the lateral plate of the cover member is disposed on the step portion of the base,
wherein the base comprises a first groove recessed from the step portion of the base and formed to have a recessed space, and
wherein the terminal portion of the circuit board is disposed on the first groove of the base so that at least a part of the terminal portion of the circuit board is disposed between the lateral plate of the cover member and the base.

2. The lens actuating unit of claim 1, wherein the base comprises a fixation protrusion protruding from a lower surface of the base, wherein the fixation protrusion is disposed lower than the step portion, and wherein the terminal portion is fixed to the fixation protrusion of the base by the adhesive.

3. The lens actuating unit of claim 2, wherein the adhesive is contacted with an inner surface of the terminal portion and an outer surface of the fixation protrusion.

4. The lens actuating unit of claim 3, wherein the base comprises a second groove formed on the outer surface of the fixation protrusion, and
wherein at least a portion of the adhesive is disposed in the second groove of the fixation protrusion.

5. The lens actuating unit of claim 2, wherein a lower end of the fixation protrusion is disposed at a position corresponding to that of a lower end of the terminal portion.

6. The lens actuating unit of claim 2, wherein the fixation protrusion comprises first and second protrusions spaced apart from each other,
  wherein the first and second protrusions of the base are coupled with the first and second fixation portions of the terminal portion, respectively, and
  wherein at least a portion of the terminal portion is exposed between the first protrusion and the second protrusion.

7. The lens actuating unit of claim 2, wherein the first groove comprises a first surface facing an inner surface of the terminal portion,
  wherein the fixation protrusion comprises a second surface facing the inner surface of the terminal portion, and
  wherein the first surface of the first groove and the second surface of the fixation protrusion are disposed on one plane.

8. The lens actuating unit of claim 1, wherein a lower end of the terminal portion of the circuit board is disposed lower than a lower end of the step portion of the base.

9. The lens actuating unit of claim 8, wherein the terminal portion is disposed in the lateral plate of the cover member.

10. The lens actuating unit of claim 1, comprising:
  a first elastic member coupled to the housing and the bobbin; and
  a second elastic member supporting the housing with respect to the base.

11. The lens actuating unit of claim 10, wherein the first elastic member comprises an upper elastic member coupled to an upper portion of the housing and an upper portion of the bobbin and a lower elastic member coupled to a lower portion of the housing and a lower portion of the bobbin,
  wherein the first elastic member comprises a plurality of elastic units spaced apart from each other, and
  wherein the plurality of elastic units of the first elastic member electrically connects the first coil and the second elastic member.

12. The lens actuating unit of claim 1, wherein the magnet comprises four magnets, and
  wherein the four magnets are disposed on four corners of the housing, respectively.

13. The lens actuating unit of claim 1,
  wherein the first and second fixation portions are formed of a nonconductive material.

14. The lens actuating unit of claim 2, wherein the cover member comprises an extension portion extending from a lower end of the lateral plate of the cover member, and
  wherein the extension portion of the cover member is disposed at a position corresponding to that of the fixation protrusion of the base.

15. A camera module, comprising:
  the lens actuating unit of claim 1;
  a lens accommodated in the bobbin of the lens actuating unit;
  a printed circuit board disposed below the base; and
  an image sensor mounted on the printed circuit board.

16. The camera module of claim 15, wherein the terminal portion is coupled to the printed circuit board by soldering.

17. An optical apparatus, comprising the camera module of claim 15.

18. The lens actuating unit of claim 1, wherein a width of the first groove corresponds to a width of the terminal portion.

19. A lens actuating unit, comprising:
  a cover member;
  a housing disposed in the cover member;
  a bobbin spaced apart from at least a portion of the housing;
  a first coil disposed in the cover member;
  a magnet disposed in the cover member and spaced apart from the first coil;
  a base disposed below the housing;
  a circuit board disposed on an upper surface of the base; and
  a second coil disposed on an upper surface of the circuit board and facing the magnet,
  wherein the circuit board comprises a circuit board portion disposed between the base and the second coil, and a terminal portion downwardly extending from the circuit board portion,
  wherein the terminal portion comprises first and second fixation portions comprising a non-conductive material, and a plurality of terminals formed of a conductive material and disposed between the first and second fixation portions,
  wherein the first and second fixation portions are fixed to the base by an adhesive,
  wherein the base comprises a step portion protruding from an outer lateral surface of the base,
  wherein the lateral plate of the cover member is disposed on the step portion of the base,
  wherein the base comprises a grove recessed from the step portion of the base, and
  wherein the terminal portion of the circuit board is disposed on the groove of the base so that at least a part of the terminal portion of the circuit board is disposed between the lateral plate of the cover member and the base.

20. The lens actuating unit of claim 19, wherein the base comprises a fixation protrusion protruding from a lower surface of the base, wherein the fixation protrusion is disposed lower than the step portion, and wherein the terminal portion is fixed to the fixation protrusion of the base by the adhesive.

* * * * *